US008790605B2

(12) United States Patent
Petig et al.

(10) Patent No.: US 8,790,605 B2
(45) Date of Patent: Jul. 29, 2014

(54) METHOD FOR REMOVAL OF CARBON DIOXIDE FROM A PROCESS GAS (75) Inventors: Arlyn V. Petig, Knoxville, TN (US); Frederic Z. Kozak, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 361 days.

(21) Appl. No.: 12/560,004

(22) Filed: Sep. 15, 2009

(65) Prior Publication Data

US 2011/0064636 A1  Mar. 17, 2011

(51) Int. Cl.
 B01D 53/62 (2006.01)
 B01D 53/75 (2006.01)
 B01D 53/78 (2006.01)
 B01D 53/14 (2006.01)

(52) U.S. Cl.
 CPC .......... *B01D 53/1475* (2013.01); *Y02C 10/04* (2013.01); *Y02C 10/06* (2013.01); *B01D 53/1425* (2013.01); *B01D 53/1406* (2013.01); *B01D 2252/102* (2013.01)
 USPC ........................ 423/234; 423/210; 423/220

(58) Field of Classification Search
 USPC ......................... 423/210, 220, 234
 See application file for complete search history.

(56) References Cited

U.S. PATENT DOCUMENTS

| | | |
|---|---|---|
| 2,106,734 A | 2/1935 | Gollmar |
| 2,043,109 A | 6/1936 | McKee et al. |
| 2,878,099 A | 3/1959 | Breuing et al. |
| 3,947,258 A | 3/1976 | Decker |
| 4,515,760 A | 5/1985 | Lang et al. |
| 4,847,057 A | 7/1989 | Brugerolle et al. |
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |

(Continued)

FOREIGN PATENT DOCUMENTS

| | | |
|---|---|---|
| AU | 648129 | 7/1992 |
| AU | 678622 | 6/1995 |

(Continued)

OTHER PUBLICATIONS

Darde, Victor et al., "Chilled ammonia process for CO2 capture." Energy Procedia, vol. 1, Issue 1 (Feb. 2009), pp. 1035-1042.*

(Continued)

*Primary Examiner* — Stanley Silverman
*Assistant Examiner* — Daniel Berns
(74) *Attorney, Agent, or Firm* — Cynthia W. Flanigan (57) ABSTRACT

The invention relates to a method of removing carbon dioxide from a process gas, the method comprising: a) allowing an ammoniated solution to enter an absorption arrangement, said absorption arrangement comprising at least a first absorber; b) contacting the ammoniated solution with the process gas in said first absorber, the ammoniated solution capturing at least a part of the carbon dioxide of the process gas; c) allowing the ammoniated solution to exit the absorption arrangement; d) cooling the ammoniated solution, wherein at least a part of the captured carbon dioxide is precipitated as solid salt; e) allowing the cooled ammoniated solution to enter a separator, in which separator at least a part of the precipitated solids are removed from the ammoniated solution, after which the ammoniated solution is allowed to exit the separator; f) heating the ammoniated solution; and g) allowing the heated ammoniated solution to re-enter the absorption arrangement. The invention also relates to a carbon dioxide removal system.

11 Claims, 2 Drawing Sheets

(56) References Cited

U.S. PATENT DOCUMENTS

| | | |
|---|---|---|
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |
| 5,453,115 A | 9/1995 | Vuletic |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 | 8/2007 | Yeh et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1* | 3/2008 | Gal .............................. 96/242 |
| 2009/0036727 A1* | 2/2009 | Kurukchi et al. ............ 585/854 |
| 2009/0101012 A1 | 4/2009 | Gal et al. |
| 2009/0104098 A1* | 4/2009 | Singh ............................ 423/224 |
| 2009/0191114 A1 | 7/2009 | Liu et al. |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| CN | 1176297 | 3/1998 |
| CN | 1772345 | 5/2006 |
| CN | 1833756 | 9/2006 |
| CN | 101318651 | 12/2008 |
| CN | 101500691 | 8/2009 |
| DE | 2832493 | 7/1978 |
| DE | 3633690 | 4/1988 |
| EP | 0243778 | 11/1987 |
| EP | 0588178 | 3/1994 |
| EP | 1759756 | 3/2007 |
| FR | 2108958 | * 5/1972 .............. C01D 7/00 |
| GB | 271852 | 5/1926 |
| GB | 899611 | 6/1962 |
| GB | 2331526 | 5/1999 |
| JP | 49-28574 | 3/1974 |
| JP | 54-19477 | 2/1979 |
| JP | 55-79026 | 6/1980 |
| JP | 57-68118 | 4/1982 |
| SU | 512785 | 5/1976 |
| SU | 1567251 | 5/1990 |
| WO | 96/10676 A1 | 4/1996 |
| WO | 98/47604 | 10/1998 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | WO 2008/072979 | 6/2008 |
| WO | WO 2009/009725 | 1/2009 |

OTHER PUBLICATIONS

Esp@cenet patent family listing for WO 2006/022885. Viewed on Mar. 15, 2013 at http://worldwide.espacenet.com/publicationDetails/inpadocPatentFamily?CC=WO&NR=2006022885A1&KC=A1&FT=D&ND=3&date=20060302&DB=EPODOC&locale=en_EP.*

A.C. Yeh, H. Bai: "Comparison of ammonia and monoethanolamine solvents to reduce $CO_2$ greenhouse gas emissions" The Science of the Total Environment, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and $NO_x$," Int. J. Environmental Tech. And Management, May 31, 2004 (approx.), pp. 89-104, vol. 4, Nos. 1/2.

PCT International Search Report and the Written Opinion of the International Searching Authority, dated Nov. 19, 2010—(PCT/US2010/047425).

Article—"Absorption and Regeneration Studies for $CO_2$ Capture by Aqueous Ammonia", James T. Yeh et al, For the presentation at the Third Annual Conference on Carbon Capture & Sequestration, May 306, 2004, Alexandria, VA, pp. 1-12.

Notice of Preliminary Rejection from the Korean Patent Office for Korean Appln. No. 10-2012-7009487, mailed Jun. 14, 2013.

First Office Action from the Chinese Patent Office issued Oct. 29, 2013 for CN application 201080051669.3.

First Office Action from the Chinese Patent Office issued Nov. 20, 2013 for CN application 201080051666.X.

First Office Action from the Chinese Patent Office issued Nov. 29, 2013 for CN application 201080051660.2.

* cited by examiner

METHOD FOR REMOVAL OF CARBON DIOXIDE FROM A PROCESS GAS

TECHNICAL FIELD

The present invention relates to a method for removal of carbon dioxide from a process gas by contacting the process gas with an ammoniated solution.

BACKGROUND

Most of the energy used in the world today is derived from the combustion of carbon and hydrogen containing fuels such as coal, oil and natural gas, as well as other organic fuels. Such combustion generates flue gases containing high levels of carbon dioxide. Due to concerns about global warming, there is an increasing demand for the reduction of emissions of carbon dioxide to the atmosphere, why methods have been developed to remove the carbon dioxide from flue gases before the gas is released to the atmosphere.

WO 2006/022885 discloses one such method of removing carbon dioxide from a flue gas, which method includes capturing carbon dioxide from the flue gas in a $CO_2$ absorber by means of an ammoniated solution or slurry. The $CO_2$ is absorbed by the ammoniated solution in the absorber at a reduced temperature of between about 0° C. and 20° C., after which the ammoniated solution is regenerated in a regenerator under elevated pressure and temperature to allow the $CO_2$ to escape the ammoniated solution as gaseous carbon dioxide of high purity.

SUMMARY

An objective of the present invention is to improve the method of carbon dioxide absorption with an ammoniated solution.

This objective, as well as other objectives that will be clear from the following discussion, is according to one aspect achieved by a method of removing carbon dioxide from a process gas, the method comprising: a) allowing an ammoniated solution to enter an absorption arrangement, said absorption arrangement comprising at least a first absorber; b) contacting the ammoniated solution with the process gas in said first absorber, the ammoniated solution capturing at least a part of the carbon dioxide of the process gas; c) allowing the ammoniated solution to exit the absorption arrangement; d) cooling the ammoniated solution, wherein at least a part of the captured carbon dioxide is precipitated as solid salt; e) allowing the cooled ammoniated solution to enter a separator, in which separator at least a part of the precipitated solids are removed from the ammoniated solution, after which the ammoniated solution is allowed to exit the separator; f) heating the ammoniated solution; and g) allowing the heated ammoniated solution to re-enter the absorption arrangement.

The absorption arrangement may comprise one or several absorbers. In its simplest design, the absorption arrangement may comprise only one absorber. This simple design will also simplify the carbon dioxide removal method and will reduce the maintenance costs for the arrangement. The absorber or absorbers may be of any design that allows direct contact between the ammoniated solution and the process gas to take place within the absorber.

By contacting the ammoniated solution with the process gas, carbon dioxide may be removed from the process gas and captured by the ammoniated solution by crossing the formed interface between the process gas and the ammoniated solution.

There is a limit to how much carbon dioxide the ammoniated solution may capture, i.e. when the ammoniated solution reaches saturation. This limit depends on e.g. the pressure and temperature of the solution. By cooling the ammoniated solution, the ability of the solution to dissolve the carbon dioxide is reduced, whereby at least a part of the captured carbon dioxide is precipitated as solid salt. Even if the ammoniated solution has not reached saturation in the absorption arrangement and no solids have been precipitated prior to the cooling of the solution, the cooling of the ammoniated solution in d) allows for precipitation of captured carbon dioxide in the form of a solid salt. Thus, at least part of the captured carbon dioxide may be separated from the ammoniated solution by the separator by removing at least a part of the precipitated solids.

The ammoniated solution exiting the separator may be saturated with carbon dioxide since the separator may only remove the carbon dioxide in solid precipitated form. By heating the ammoniated solution in f), the ability of the solution to dissolve carbon dioxide is increased, allowing the ammoniated solution to return to the absorption arrangement to capture more carbon dioxide without precipitation of solids.

By cooling the ammoniated solution, removing the solids, and re-heating the solution, most of the ammoniated solution may be returned to the absorption arrangement to capture more carbon dioxide without precipitation of solids. Thus, there is no need to regenerate the entire solution stream. Instead, the much smaller volume of solids, and optionally some solution, removed by the separator and having a much higher carbon dioxide concentration may be transferred to a regenerator. Since the regenerator applies increased pressure and temperature to the solution, suspension or slurry being regenerated in order to obtain leaving carbon dioxide of high purity, the energy consumption is much reduced if the volume of the solution, suspension or slurry is reduced and the carbon dioxide concentration is increased.

Also, by inducing precipitation of solids by cooling the ammoniated solution, carbon dioxide in the form of solid salt may be removed from the ammoniated solution even though the ammoniated solution exiting the absorption arrangement contains no precipitated solids, i.e. the ammoniated solution exiting the absorption arrangement might be rich in carbon dioxide but not completely saturated or supersaturated and still allow for removal of carbon dioxide in solid form by the separator. This implies that the precipitation of solids within the absorption arrangement and the absorber may be reduced or even stopped completely compared with if no cooling was performed. Precipitation of solids may be undesirable since the solids may clog pipes, valves, pumps, absorbers etc., and may also increase the wear of the absorption arrangement due to increased abrasion by the ammoniated solution flow. If there is no, or only reduced, precipitation in the absorption arrangement, the absorption arrangement may not have to be designed to accommodate for solid particles in the ammoniated solution whereby the absorption arrangement may be designed in a simpler way and for more efficient carbon dioxide capture, e.g. by a more effective packing material in the absorber if a packing material is used, which packing material might otherwise be clogged and result in excessive pressure drop. Also, the maintenance of the absorption arrangement may be greatly reduced.

It may be convenient to control the temperature of the ammoniated solution as it contacts the process gas in the first absorber, thus also the temperature of the first absorber, i.e. the temperature at which the carbon dioxide is captured by the ammoniated solution, may be controlled. As the temperature is reduced, the rate at which the carbon dioxide is captured from the process gas by the ammoniated solution is also reduced. If the temperature is increased, the rate at which gaseous ammonia leaves and depletes the ammoniated solution is also increased. The temperature of the absorber is thus a trade-off between capture rate and ammonia depletion. It has been found that a temperature of the ammoniated solution as it is contacted with the process gas in the first absorber of between about 10° C. and 20° C. (50° F. and 68° F.) may be convenient, especially a temperature of about 15° C. (59° F.). Other temperatures may also be of interest, depending on the design of the absorption arrangement.

When cooling the ammoniated solution, step d), after it has left the absorption arrangement, the ammoniated solution may be cooled to a temperature below the temperature of the ammoniated solution in the first absorber. The lower the temperature is to which the ammoniated solution is cooled, the more solids may be precipitated. However, the cooling energy needed is also increased. If the ammoniated solution is an aqueous solution under atmospheric pressure, the ammoniated solution is preferably not cooled to below 0° C. (32° F.). It has been found that it may be convenient to cool the ammoniated solution to a temperature between about 0° C. and 10° C. (32° F. and 50° F.), especially to a temperature of about 5° C. (41° F.). Of course, other temperatures may also be of interest depending on system design.

After the ammoniated solution has exited the separator the solution may be essentially saturated with carbon dioxide, but with reduced or no solids content. This solution is then heated to a temperature above the temperature to which it was previously cooled, thus making the ammoniated solution less saturated or unsaturated with carbon dioxide. The more the solution is heated, the less saturated, or more unsaturated, the ammoniated solution will become. However, more heating also requires more energy consumption. Also, a higher temperature of the ammoniated solution also increases the ammonia depletion of the ammoniated solution as gaseous ammonia leaves the ammoniated solution. It has been found that the ammoniated solution may conveniently, in step f) above, be heated to at least 7° C. (45° F.), such as to between about 7° C. and 15° C. (45° F. and 59° F.), especially to between about 7° C. and 10° C. (45° F. and 50° F.). Of course, other temperatures may also be of interest depending on system design.

The cooling and/or the heating, respectively, of the ammoniated solution may e.g. be done with heat exchangers. It has been realized that it might be advantageous to at least partly perform the cooling and the heating by means of the same heat exchanger, in which heat exchanger the ammoniated solution exiting the absorption arrangement in c) is the heating medium and the ammoniated solution exiting the separator in e) is the cooling medium. Thus, energy may be conserved. Using the cooled and separated ammoniated solution as a cooling medium for cooling the ammoniated solution which has exited the absorption arrangement might not be sufficient for cooling the ammoniated solution which has exited the absorption arrangement, why it might be convenient to additionally use a regular cooling medium, such as cold water. The regular cooling medium may be connected to the same heat exchanger as the separated ammonium solution, or to a separate heat exchanger. Thus, the ammoniated solution exiting the absorption arrangement may be first cooled by the ammonium solution from the separator and then be additionally cooled by means of the regular cooling medium. Alternatively, the ammoniated solution is not used as a cooling or heating medium, but regular cooling and heating mediums are used instead.

The separator may be any type of separator able to separate, and thus remove, solid particles or material from the ammoniated solution. Depending on the requirements put on the separator, it might be convenient to use a separator in the form of a hydrocyclone. A hydrocyclone may be an efficient way of removing solids from the ammoniated solution. The suspension or slurry of the ammoniated solution comprising solids enters the hydrocyclone where the suspension or slurry is separated into an overhead solution reduced in, or free from, solids and an underflow rich in solids. It has been found that it may be convenient with a solids content of the ammoniated solution comprising solids entering the hydrocyclone of between about 5% and 10% by weight of the ammoniated solution comprising solids entering the hydrocyclone. Ideally, essentially all the solids are removed from the ammoniated solution, giving an overhead solution essentially free from solids. It has been found that it may be convenient with a solids content of the overhead solution of between 0% and 1% by weight of the overhead solution. The underflow may be allowed to also contain some liquid solution in order to facilitate transporting the solids in a liquid stream, thus some of the ammoniated solution may also be separated to the underflow. The amount of liquid in the underflow may be enough to transport the solids in a liquid stream but without reducing the carbon dioxide concentration more than necessary to allow this transportation. The underflow may be a leaving suspension or slurry, leaving the ammoniated solution.

Regardless of the type of separator used, it may be convenient that most or essentially all of the solids are removed from the ammoniated solution to a leaving suspension or slurry, in which suspension or slurry the amount of liquid has been balanced to allow transportation of the solids in a liquid stream but without reducing the carbon dioxide concentration more than necessary to allow this transportation. It may be convenient to have a solids content of at least 10% by weight of the leaving suspension or slurry, such as between about 10% and 20% by weight of the leaving suspension or slurry.

According to another aspect, the present objective is achieved by a carbon dioxide removal system for removing carbon dioxide from a process gas, the system comprising: an absorption arrangement, said absorption arrangement comprising at least a first absorber, said first absorber being arranged to, inside said first absorber, allow contact between the process gas and an ammoniated solution such that at least a part of the carbon dioxide of the process gas is captured by the ammoniated solution; a first heat exchanger arranged to cool the ammoniated solution including captured carbon dioxide after it has exited the absorption arrangement; a separator arranged to remove at least a part of any solids in the cooled ammoniated solution; a second heat exchanger arranged to heat the ammoniated solution after it has exited the separator; and piping connecting, and arranged to allow a flow of the ammoniated solution between, the absorption arrangement and the first heat exchanger, the first heat exchanger and the separator, the separator and the second heat exchanger, as well as the second heat exchanger and the absorption arrangement.

It may be convenient to use the carbon dioxide removal system in performing the method discussed above.

It may be convenient to arrange the first and second heat exchangers to cooperate with each other such that the ammoniated solution being cooled in the first heat exchanger is at least partly cooled by the ammoniated solution being heated in the second heat exchanger as cooling medium, and the ammoniated solution being heated in the second heat exchanger is at least partly heated by the ammoniated solution being cooled in the first heat exchanger as heating medium.

The discussion above relating to the method is in applicable parts also relevant to the system. Reference is made to that discussion.

BRIEF DESCRIPTION OF THE DRAWINGS

Currently preferred embodiments will now be discussed with reference to the drawings, in which.

DETAILED DESCRIPTION OF PREFERRED EMBODIMENTS

The process gas may be any type of process gas containing carbon dioxide, such as flue gas from any combustion device such as furnaces, process heaters, incinerators, package boilers, and power plant boilers.

The ammoniated solution may be any type of solution containing ammonia, such as a liquid solution, especially an aqueous solution. The ammonia in the ammoniated solution may be in the form of ammonium ions and/or dissolved molecular ammonia.

The capturing of $CO_2$ from the process gas by the ammoniated solution may be achieved by the ammoniated solution absorbing or dissolving the $CO_2$ in any form, such as in the form of dissolved molecular $CO_2$, carbonate or bicarbonate.

The solids formed in the ammoniated solution may mainly be ammonium carbonate and ammonium bicarbonate, especially ammonium bicarbonate.

The carbon dioxide removal system comprises piping that connects the different parts of the system and is arranged to allow ammoniated solution and process gas, respectively, to flow through the system as needed. The piping may comprise valves, pumps, nozzles etc. as appropriate to control the flow of ammoniated solution and process gas, respectively.

The one or several absorbers of the absorbing arrangement may have any design that allows the ammoniated solution to contact the process gas. It may be convenient with an absorber design in the form of a column, where the ammoniated solution flows from the top of the column to the bottom of the column and the process gas flows from the bottom of the column to the top of the column, thus the solution and the gas may meet and mix with each other in the column, creating an interface between the solution and the gas across which interface carbon dioxide may travel from the gas to the solution. The gas/solution contact may be increased, i.e. the interface area may be increased, by using a packing in the column, thereby improving the carbon dioxide capturing. The respective flows of the process gas and the ammoniated solution within, as well as to and from, the absorption arrangement may be controlled by at least one pumping system and/or by act of gravity.

If an absorber in the form of a column is used, the process gas may enter the column via a pipe connected to the lower part of the column, travel upwards through the column and exit the column via a pipe connected to the upper part of the column, and the ammoniated solution may enter via a pipe connected to the upper part of the column, travel downwards through the column by action of gravity and exit the column via a pipe connected to the lower part of the column. The ammoniated solution and/or the process gas may additionally be recirculated in the column. If the ammoniated solution is recirculated, the ammoniated solution may alternatively be entered into the column at the lower part of the column instead of at the upper part of the column, allowing a recirculation loop to transport the solution to the upper part of the column. The column may be associated with a pumping system to effect the recirculation.

In order to control the temperature of the column, a heat exchanger may be associated with the column. The heat exchanger may e.g. form part of a recirculation loop for the ammoniated solution. Since the capturing of carbon dioxide by the ammoniated solution is an exothermic reaction, the heat exchanger may be used to cool down the ammoniated solution to keep the interior of the absorber at a desired and essentially constant temperature.

Depending of the design of and the demands put on the absorption arrangement, it may be convenient to use a plurality of absorbers in order to remove a desired amount of the carbon dioxide from the process gas.

If a plurality of absorbers are used, they may have the same or different designs. The absorbers may be serially connected to each other to allow process gas and/or ammoniated solution to serially flow from one absorber to another absorber. However, it should be noted that the gas and the solution may flow in different directions between the serially connected absorbers. If e.g. an absorption arrangement comprises three serially connected absorbers, denoted x, y and z, the gas flow may be from absorber x to absorber y to absorber z, whereas the flow of the ammoniated solution may e.g. be from absorber y to absorber x to absorber z or in any other order.

Figure 1:
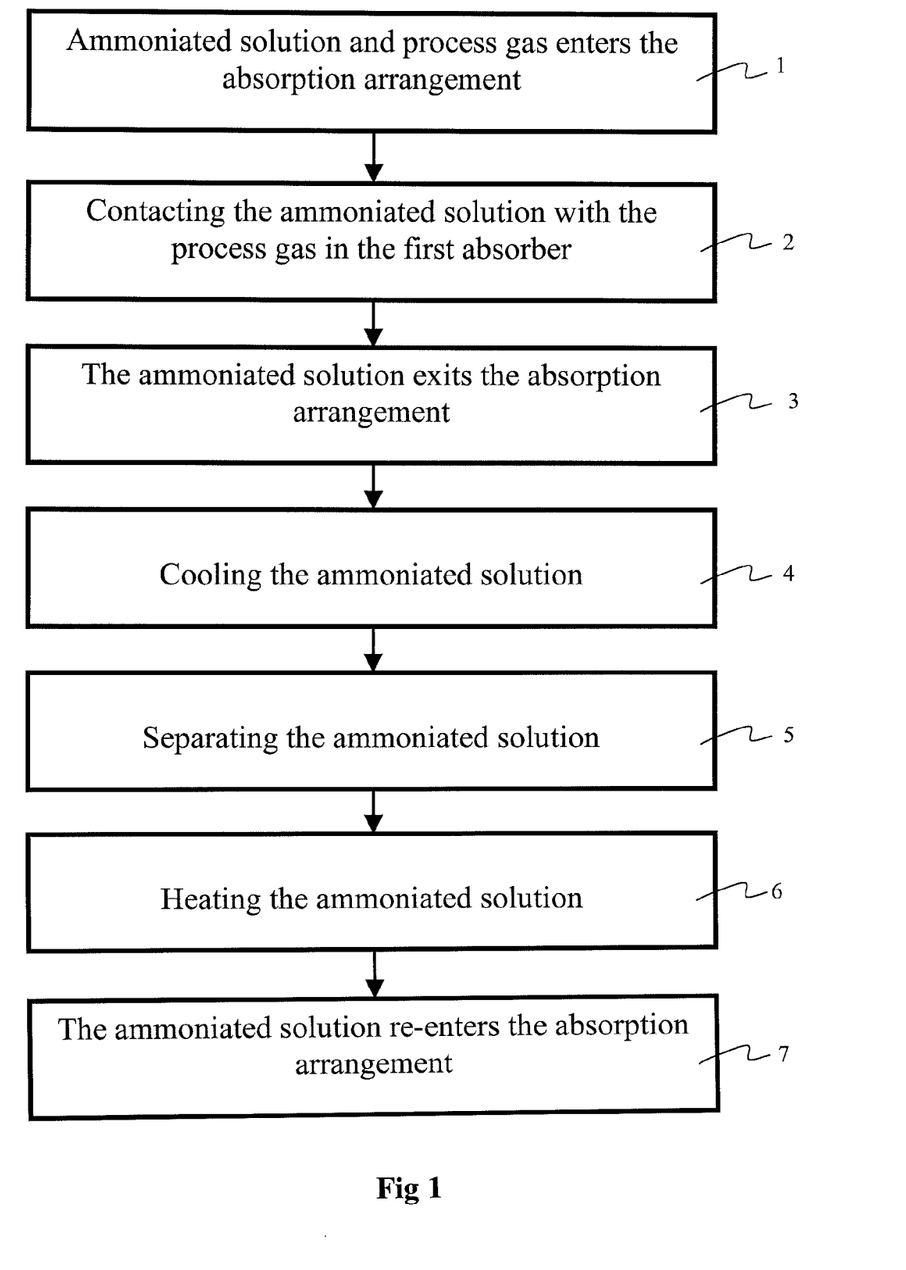
FIG. 1 is a process flow chart illustrating the steps of a method in accordance with the present invention.

With reference to FIG. 1, a currently preferred method in accordance with the present invention will now be described.

In step 1, the ammoniated solution in the form of an aqueous solution, as well as the process gas, enters the absorption arrangement via pipes. The absorption arrangement may comprise one or a plurality of absorbers, preferably in the form of packed columns.

In step 2, the ammoniated solution, as well as the process gas, enters the first absorber column via separate pipes connected to said first absorber column. The ammoniated solution enters the absorber column via a pipe at the top of the column, after which the ammoniated solution flows downward though the packed column of the first absorber. Simultaneously, the process gas enters the first absorber column via a pipe at the bottom of the column, after which the process gas flows upward though the packed column of the first absorber. The ammoniated solution and the process gas thus meet and are contacted with each other as they flow counter currently in the first absorber column. The packing of the column acts to increase the mixing and the contact area, interface, between the liquid phase and the gas phase in the column. Carbon dioxide of the process gas travels from the gas phase into the liquid phase and is thus captured by the ammoniated solution. The ammoniated solution and/or the process gas may be recirculated in the absorber. Thus, the ammoniated solution may leave the absorber via a pipe at the bottom of the absorber column and pumped back to the top of the absorber to re-enter the absorber. During this re-circulation outside of the absorber, the temperature of the ammoniated solution may also be adjusted by means of a heat exchanger.

It should be noted that the ammoniated solution and/or the process gas may have already passed though one or several absorbers after entering the absorption arrangement prior to entering said first absorber, depending on the design of the system.

In step 3, the ammoniated solution leaves the first absorber as well as the absorption arrangement via a pipe.

In step 4, the ammoniated solution enters at least one heat exchanger and is cooled down. As a result of the cooling, a part of the captured carbon dioxide is precipitated as salt. It may be preferred to use two separate heat exchangers, the first using cooled ammoniated solution as cooling medium and the second using cold water as cooling medium.

In step 5, the cooled ammoniated solution including salt solids enters a hydrocyclone. In the hydrocyclone, the ammoniated solution is separated into a solid rich underflow and an overhead solution with less than 1 wt % solids. Thus, most of the solids have been removed from the ammoniated solution by the hydrocyclone. The solid rich underflow may be transferred to a regenerator where it is subjected to increased temperature and increased pressure in order to remove the captured carbon dioxide in the form of a leaving carbon dioxide gas stream of high purity. The thus regenerated ammoniated solution from the underflow may then be allowed to re-enter the carbon dioxide removal system to capture more carbon dioxide.

In step 6, the ammoniated solution, i.e. the overhead solution from the hydrocyclone, is reheated. In order to save energy, the reheating may preferably by made by means of the same first heat exchanger as discussed under step 4, with the ammoniated solution cooled in step 4 as heating medium. If needed, an additional heat exchanger with a traditional heating medium, such as warm water, may also be employed. In heating the ammonium solution, the solution is rendered unsaturated with respect to carbon dioxide, allowing it to capture more carbon dioxide without inducing any precipitation.

In step 7, the reheated ammonium solution re-enters the absorption arrangement to capture more carbon dioxide from the process gas, either in the first absorber column or in a different absorber if a plurality of absorbers are comprised in the absorption arrangement.

It should be noted that the method may be continuous. Thus all the steps above may occur concurrently involving different parts of the ammoniated solution.

Figure 2:
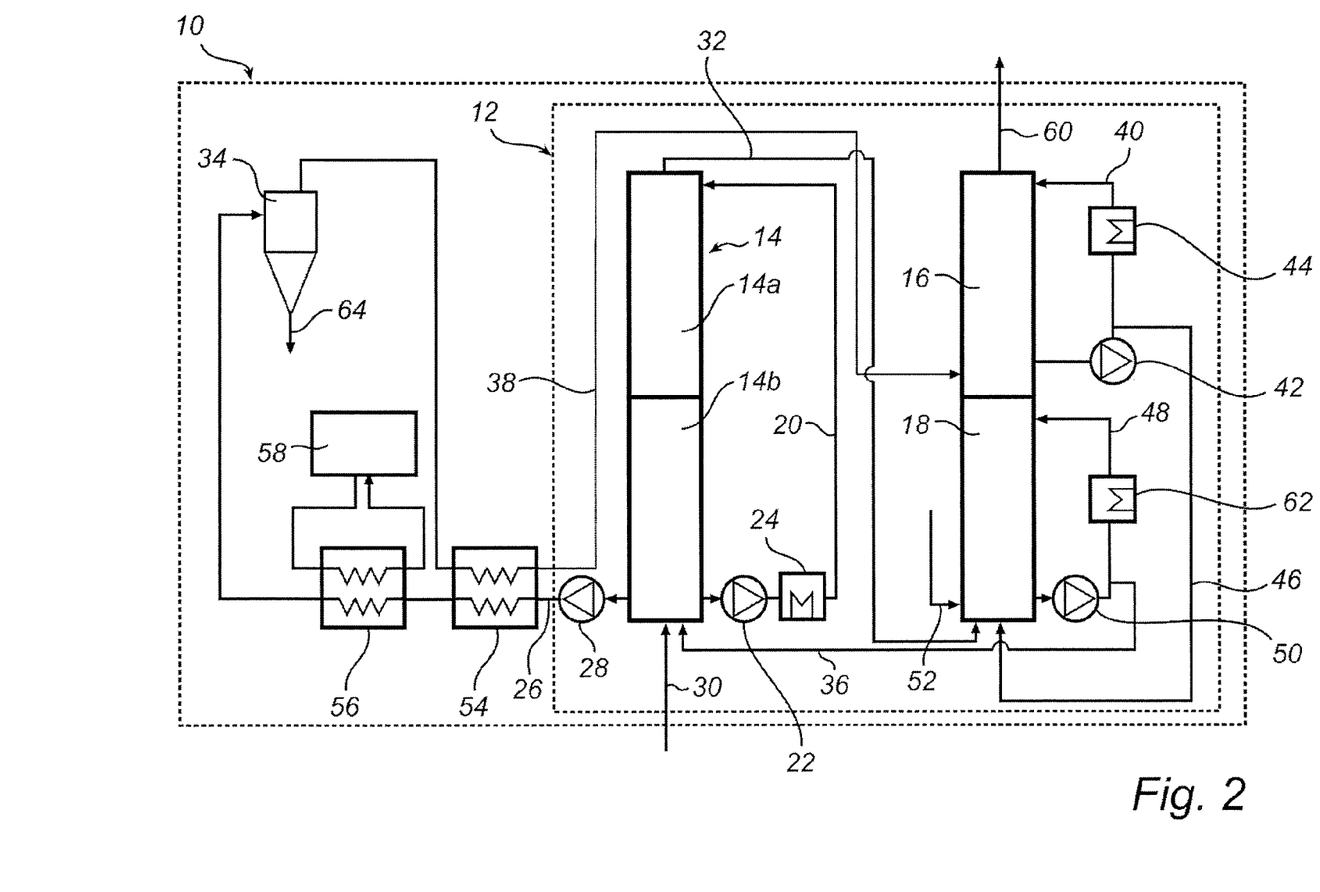
FIG. 2 is a schematic front view of a carbon dioxide removal system in accordance with the present invention.

With reference to FIG. 2, a currently preferred carbon dioxide removal system 10 in accordance with the present invention, arranged to perform a currently preferred method in accordance with the present invention, will now be described. In the FIG. 2, the piping is represented by arrows for easier understanding.

The carbon dioxide removal system 10 comprises an absorption arrangement 12, which absorption arrangement 12 comprises three absorption columns, a first absorption column 14, a second absorption column 16 and a third absorption column 18. The first absorption column comprises an upper packed bed 14a and a lower packed bed 14b.

A first absorption column process gas inlet piping 30 is connected to the bottom part of the first absorption column 14 for allowing process gas including carbon dioxide from e.g. a power plant to enter the first absorption column 14. A first absorption column process gas outlet piping 32 is connected to the top part of the first absorption column 14 for allowing process gas to leave the column 14 towards the third column 18 after having flown through the column 14 from the bottom to the top.

A first absorption column recirculation loop 20 is connected to the first absorption column 14, allowing ammoniated solution to flow through piping from the bottom of the absorption column 14 to the top of the column 14. A pump 22 is comprised in the loop 20 to effect the circulation of the ammoniated solution. Also, a heat exchanger 24 is comprised in the loop 20 for controlling the temperature of the ammoniated solution.

A first absorption column ammoniated solution outlet piping 26 is arranged to lead ammoniated solution away from the bottom part of the first absorption column 14 towards the hydrocyclone 34. The outlet piping 26 comprises an outlet pump 28 for controlling the outlet flow of ammoniated solution from the first absorption column 14.

A first absorption column ammoniated solution inlet piping 36 is arranged to allow ammoniated solution to flow from the third column 18 to the bottom part of the first column 14, where it is allowed to be mixed with, and recirculated with, the ammoniated solution being recirculated in the first column 14 by means of the recirculation loop 20.

A second absorption column ammoniated solution inlet piping 38 is arranged to allow ammoniated solution to flow from the hydrocyclone 34 to the bottom part of the second column 16, where it is allowed to be mixed with, and recirculated with, the ammoniated solution being recirculated in the second column 16 by means of a recirculation loop 40 associated with the column 16.

The second absorption column recirculation loop 40 is connected to the second absorption column 16, allowing ammoniated solution to flow through piping from the bottom of the absorption column 16 to the top of the column 16. A pump 42 is comprised in the loop 40 to effect the circulation of the ammoniated solution. Also, a heat exchanger 44 is comprised in the loop 40 for controlling the temperature of the ammoniated solution.

Connected to the second absorption column recirculation loop 40 is a third column ammoniated solution inlet piping 46 arranged to allow flow of ammoniated solution from the recirculation loop 40 to the bottom of the third column 18 where it is allowed to be mixed with, and recirculated with, the ammoniated solution being recirculated in the third column 18 by means of a recirculation loop 48 associated with the column 18. The flows through the piping 46 and the recirculation loop 40, respectively, are controlled by valves (not shown) included in the piping 46 and loop 40.

The third absorption column recirculation loop 48 is connected to the third absorption column 18, allowing ammoniated solution to flow through piping from the bottom of the absorption column 18 to the top of the column 18. A pump 50 is comprised in the loop 48 to effect the circulation of the ammoniated solution. Also, a heat exchanger 62 is comprised in the loop 48 for controlling the temperature of the ammoniated solution.

The bottom of the third column is also connected to a supply of lean ammoniated solution via the lean feed piping 52. Lean ammoniated solution, e.g. from the regeneration process, may thus be fed into the bottom of the third column 18 via piping 52 where the lean solution is allowed to be mixed with, and recirculated with, the ammoniated solution being recirculated in the third column 18 by means of the recirculation loop 48 as well as with the ammoniated solution fed to the bottom of column 18 via the piping 46 from the second column 16.

Connected to the third absorption column recirculation loop 48 is the first column ammoniated solution inlet piping 36 arranged to allow flow of ammoniated solution from the recirculation loop 48 to the bottom of the first column 14 where it is allowed to be mixed with, and recirculated with, the ammoniated solution being recirculated in the first column 14 by means of the recirculation loop 20 associated with the column 14. The flows through the piping 36 and the recirculation loop 48, respectively, are controlled by valves (not shown) included in the piping 36 and loop 48.

The first absorption column process gas outlet piping 32 is connected to the bottom part of the third column 18, allowing the gas to enter the column 18 and flow upwards through the column 18. As the process gas reaches the top of the column 18, it may enter the second column 16 through the bottom of said second column 16, the second column 16 being arranged above the third column 18, via piping (not shown) connecting the top of column 18 with the bottom of column 16. Carbon dioxide cleaned process gas may exit the second column 16 via the gas outlet 60 connected to the top of the column 16.

The first absorption column ammoniated solution outlet piping 26, connected to the bottom part of the first column 14, allows ammoniated solution rich with carbon dioxide from counter currently contacting the carbon dioxide rich process gas in the first column 14 to leave the first column 14 as well as to exit the absorption arrangement 12. The outlet piping 26 is connected to a first heat exchanger 54, external to the absorption arrangement 12, in which heat exchanger 54 ammoniated solution from the first column 14 may be cooled down by exchanging heat with cooler ammoniated solution from the hydrocyclone 34.

The first heat exchanger 54 is connected to a second heat exchanger 56 connected to a cold water source 58, in which second heat exchanger 56, the ammoniated solution may be further cooled down by exchanging heat with cold water from the cold water source 58.

The second heat exchanger 56 is connected to the hydrocyclone 34, allowing ammoniated solution, including any precipitated solids, to enter the hydrocyclone 34 in which the ammoniated solution is separated into a solids rich feed, the underflow, and an overhead solution essentially free from solids. The underflow may be removed from the system 10 via the outlet pipe 64 to e.g. a regenerator (not shown).

The hydrocyclone 34 is connected to the first heat exchanger 54 to allow the overhead solution to be heated by exchanging heat with the warmer ammoniated solution exiting the first column 14.

The first heat exchanger 54 is connected to the second column 16 via the inlet piping 38, allowing ammoniated solution to re-enter the absorption arrangement 12.

EXAMPLE

With reference to FIG. 2, a specific preferred embodiment will now be described by way of an example.

Flue gas coming from a power plant wet flue gas desulfurization system is cooled in the existing preceding process equipment before entering the carbon dioxide removal system 10 and the absorber arrangement 12. As the water saturated flue gas is cooled, water is condensed. This flue gas is compressed and cooled further to 15° C. (59° F.), i.e. to the temperature of the first absorption column 14.

The flue gas enters the first absorption column 14, passes up through the packed column and is contacted counter currently by the ammoniated absorption solution. $CO_2$ is captured by the ammoniated solution. About 70 percent of the carbon dioxide captured by the system 10 is captured in the first column 14. The first absorber operates at approximately 15° C. (59° F.) to take advantage of the increased rate of reaction of this relatively high temperature. This high operating temperature also avoids the production of solids in the packed column. The flow rate of ammoniated solution from the third absorber 18 to the first absorber 14 is matched to the flow rate of lean feed solution to the third absorber. Heat of reaction is removed from the column 14 by passing the ammoniated solution through a chilled water cooled heat exchanger 24 located in the circulation loop 20.

Ammoniated solution is pumped from the third absorption column 18 to the first absorption column 14. During circulation in the first absorption column 14, the solution increases $CO_2$ content by capture from the flue gas. The $CO_2$ content of the ammoniated solution increases to the saturation concentration but does not precipitate solids due to the relatively high operating temperature.

The flue gas now enters the third absorption column 18. The flue gas passes up through the packed column 18 and contacts lean ammoniated solution introduced into the third column 18 counter currently. Heat of reaction is removed by circulating the solution through a chilled water cooled heat exchanger in the circulation loop 48. Lean solution from the regeneration process enters the bottom of the column 18 to mix with the solution inventory already present. This does not require a high head pump as the elevation change is small (the lean solution feed tank is located on the ground, as is the bottom of the third absorber 18). The flow is limited depending on the flue gas flow rate being processed. Additional ammoniated solution being discharged from the second absorption column 16 also enters the third absorption column 18. Approximately 20 percent of the captured $CO_2$ is captured in the third absorption column 18.

The solution is circulated in the third absorber 18 to capture $CO_2$ from the flue gas passing through. Solids are not produced in this step of the absorption process. The third absorber 18 operates at a temperature of 10° C. (50° F.) to enhance the capture of $CO_2$ from the flue gas stream that has already had most of the $CO_2$ removed. Solids are not produced because the circulating solution is relatively lean (not saturated with $CO_2$ products).

The flue gas next enters the second absorption column 16. The flue gas passes up through the packed bed to counter currently contact the ammoniated solution being circulated via loop 40. This absorption column 16 is operated at a lower temperature, about 7° C. (45° F.) to aid in capturing ammonia vapors lost from the previous absorption columns 14 and 18 to the flue gas. Some $CO_2$ (approximately 10 percent of the total captured) is also captured in the second absorption column 16. Heat of reaction is removed by circulating the absorption solution through a chilled water cooled heat exchanger 44.

The ammoniated solution transferred to the second absorption column 16 is saturated with dissolved $CO_2$ (ammonium bicarbonate) as it leaves the hydrocyclone. The temperature of the absorption solution is increased partly by means of the heat exchanger 54 to unsaturate the ammoniated absorption solution and to prevent the formation of solids in the second absorption column 16. Part of the temperature increase is achieved by heat interchange. The remainder of the temperature increase is due to heat of reaction in the second absorption column.

The ammoniated absorption solution coming from the second absorption column 16 is pumped to the third absorption column 18. In the third absorption column 18, the solution from the second column 16 mixes with the incoming lean solution from the regenerator and the existing solution inventory. At this point the process begins again, forming a circulation loop.

$CO_2$ compounds (ammonium bicarbonate) are removed from the solution contained in the first absorption column 14 in the following way: The solution is pumped by the pump 28 from the first absorption column 14 and enters a heat exchanger 54. Cooling for the heat exchanger is provided by the returning solids free cold solution from the hydrocyclone 34. Next the solution passes through a second heat exchanger 56 to cool the solution sufficiently so that significant quantities of solids precipitate from solution. Cooling for the second heat exchanger 56 is provided by cold water. The heat exchanger 54 reduces the temperature of the solution to 13°

C. (55° F.). In the process of cooling the solution, the solubility limit of ammonium bicarbonate is reached and solids begin to precipitate.

The solution with solids then flows to the second heat exchanger 56 that is cooled by chilled water. This heat exchanger 56 cools the solution and solids down to 5° C. (41° F.) to complete the precipitation of solids from the solution. Part of the heat duty of the second heat exchanger is the heat of crystallization of the ammonium bicarbonate solids. The rich saturated solution will release ammonium bicarbonate solids at a rate corresponding to the $CO_2$ capture rate of the absorbers. The solids in the slurry could reach approximately 10 weight percent at this point.

The heat duty of this second heat exchanger 56 is high during process start-up. After the process is operating, the only heat duty of this exchanger 56 is the relatively small amount of cooling required to bring the process solution temperature from about 13° C. (56° F.) down to 5° C. (41° F.). This heat duty is actually cooling the rich slurry feed stream down and includes the heat duty of crystallizing the ammonium bicarbonate solids out of solution.

The slurry produced in the heat exchangers 54 and 56 is then routed to the hydrocyclone 34 for solids removal. The hydrocyclone 34 removes essentially all of the solids along with some of the liquid ammoniated solution. Sufficient liquid is removed with the solids to prevent plugging of pipes and control equipment downstream.

The slurry underflow is sent to a rich feed storage tank to be fed to the regenerator. The liquid level in the rich feed tank will be controlled by balancing the input flow rate of slurry with the output flow of rich feed (slurry) to the regenerator.

The essentially solids free (less than 1% solids) overhead solution is transferred back to the first heat exchanger 54 where it is utilized to cool down the saturated solution coming from the first absorption column 14. The solids free solution is at the same time heated to about 7° C. (45° F.). Any difference in temperature needed for process control is corrected by adjusting the coolant flow to the other absorber process heat exchangers 24, 44 and 62.

The solids free solution is then routed to the second absorption column 16 to continue the absorption process. In the second absorber 16, the solution mixes with the inventory of the column and is used to capture ammonia from the flue gas flowing from the third absorber 18. The high ammonia concentration in the third absorber 18 results in the high ammonia losses to the flue gas flowing to the second absorber 16. Some $CO_2$ is also captured in the second absorber (approximately 10 percent of the total $CO_2$ captured).

It should be noted that the cooling of the ammoniated solution prior to entry into the hydrocyclone 34 does not increase the cooling load of the process since cooling would otherwise have to be increased in the recirculation loops due to the exothermic reactions taking place in the absorbers.

Solid ammonium bicarbonate is not present in the absorbers. This allows the use of packing materials that are sensitive to the presence of solids but delivers excellent mass transfer. The pumps providing circulation are never compromised by the presence of solids. The pump seals are also not compromised by the presence of solids.

The ammonium bicarbonate is precipitated out of solution in the heat exchangers 54 and 56 outside of the absorption arrangement 12. These heat exchangers are outside the absorber process and are fabricated in such a way as to not be adversely affected by the presence of solids.

The ammoniated solution that is free of solids after leaving the hydrocyclone is reheated by interchange in the heat exchanger 54 to recover the cooling that was used to cause precipitation. This step saves the cost of any cooling that can be recovered, thereby reducing the energy penalty of the entire process.

The solution sent to the second absorber 16 for ammonia capture does not contain solids so that solids deposition in the absorber does not occur. The temperature of the returning solution is above the carbon dioxide saturation temperature so that additional ammonium bicarbonate can be produced without allowing any solids deposition.

The solution coming from the second absorber 16 is routed to the third absorber 18 to mix with the incoming lean solution to resume the $CO_2$ capture process. This destination prevents solids accumulation in the solution that has been shown to have detrimental effects.

As the weight percent solids of the rich slurry feed to the regenerator increases, the heat per mass unit of product $CO_2$ produced decreases. The reason for this is the significant reduction in heating required for the liquid accompanying the slurry at high weight percentages versus the relatively large amount of liquid accompanying the solids in a low weight percent solids slurry.

The equipment cost of the entire process is reduced by correctly sizing the heat exchangers for the absorber columns to just remove the heat required to maintain process conditions. Some heat of reaction and most of the cooling of flue gas required by the process are removed by adding cold solution from the hydrocyclone overhead back to the absorbers.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode currently contemplated for carrying out this invention, but that the invention will include all embodiments falling within the scope of the appended claims. Moreover, the use of the terms first, second, etc. do not denote any order or importance or chronology, but rather the terms first, second, etc. are used to distinguish one element from another.

The invention claimed is:

1. A method of removing carbon dioxide from a process gas, the method comprising:
   a) allowing an ammoniated solution to enter an absorption arrangement, said absorption arrangement comprising at least a first absorber operating at a temperature between about 10° C. to 20° C. (50° F. to 68° F.);
   b) contacting the ammoniated solution with the process gas in said first absorber, the ammoniated solution capturing at least a part of the carbon dioxide of the process gas;
   c) allowing the ammoniated solution to exit the first absorber;
   d) cooling the ammoniated solution exiting the first absorber to a temperature between about 0° C. to 10° C. (32° F. to 50° F.), wherein at least a part of the captured carbon dioxide is precipitated as solid salt;
   e) allowing the cooled ammoniated solution to enter a separator, in which separator at least a part of the precipitated solids are removed from the cooled ammoniated solution, after which the cooled ammoniated solution is allowed to exit the separator;
   f) heating the cooled ammoniated solution; and g) allowing the heated ammoniated solution to re-enter the absorption arrangement; and wherein some liquid solution is also removed together with the solids in the separator, forming a leaving suspension or slurry, which suspension or slurry has a solids content of between about 10% and 20% by weight of the suspension or slurry.

2. The method of claim 1, wherein the cooling of d) and the heating of f) is at least partly achieved by means of a heat exchanger, in which heat exchanger the ammoniated solution exiting the absorption arrangement in c) is the heating medium and the ammoniated solution exiting the separator in e) is the cooling medium.

3. The method of claim 1, wherein the cooling of d) is at least partly achieved by means of a heat exchanger, in which heat exchanger cold water is used as a cooling medium.

4. The method of claim 1, wherein the separator is a hydrocyclone.

5. The method of claim 1, further comprising:
h) contacting the heated ammoniated solution with the process gas in a second absorber of the absorption arrangement, the second absorber being separate from the first absorber, the ammoniated solution absorbing and solving at least a part of the carbon dioxide of the process gas in the second absorber.

6. The method of claim 1, wherein the temperature of the ammoniated solution in b) is between about 10° C. and 20° C. (50° F. and 68° F.).

7. The method of claim 6, wherein the temperature of the ammoniated solution in b) is about 15° C. (59° F.).

8. The method of claim 1, wherein the ammoniated solution is in d) cooled to about 5° C. (41° F.).

9. The method of claim 8, wherein the cooled ammoniated solution is in f) heated to at least 7° C. (45° F.).

10. The method of claim 9, wherein the cooled ammoniated solution is in f) heated to between about 7° C. and 15° C. (45° F. and 59° C.).

11. The method of claim 9, wherein the cooled ammoniated solution is in f) heated to between about 7° C. and 10° C. (45° F. and 50° C.).

* * * * *